O. A. PRIBORSKY.
ROLLING PIN.
APPLICATION FILED MAR. 15, 1920.
1,357,001.
Patented Oct. 26, 1920.
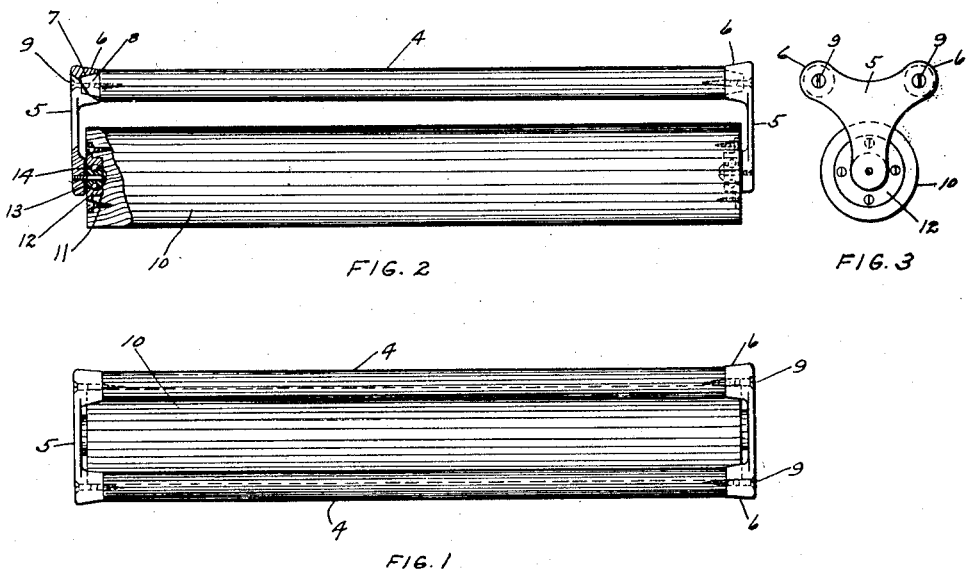
INVENTOR
O.A. PRIBORSKY
BY
ATTORNEY

UNITED STATES PATENT OFFICE.

OTTO ALEXANDER PRIBORSKY, OF SIOUX CITY, IOWA.

ROLLING-PIN.

1,357,001.  Specification of Letters Patent.  Patented Oct. 26, 1920.

Application filed March 15, 1920. Serial No. 365,782.

*To all whom it may concern:*

Be it known that I, OTTO ALEXANDER PRIBORSKY, a citizen of the United States, and a resident of Sioux City, in the county of Woodbury and State of Iowa, have invented certain new and useful Improvements in Rolling-Pins, of which the following is a specification.

My invention has for its primary object the production of a rolling-pin embodying certain novel features and characteristics whereby it can be conveniently operated with one hand.

Another object of the invention is the production of an improved rolling-pin, simple and inexpensive in construction and adapted to be used with one hand.

These and other objects and advantages I successfully attain in the structure hereinafter described, defined in the appended claims, and illustrated in the accompanying drawings, which form a part of this application, and in which like characters of reference indicate corresponding parts throughout the several views, of which—

Figure 1 is a plan of a rolling-pin constructed in accordance with the invention;

Fig. 2 is a side elevation thereof, a portion being cut away, and

Fig. 3 is an end elevation thereof.

Although I have illustrated, and hereinafter described but one embodiment suitable for practising the invention, I would not be understood as being limited to the specific structure chosen for illustration, for many alterations and modifications may be made in the details of construction and arrangement of parts, without departing from the spirit and scope of the invention, as defined in the appended claims.

Referring now to the illustrations, my improved rolling-pin includes two parallel cylindrical handle-bars, 4, at the ends of which are bearing plates, 5, preferably triangular and having two corner portions thereof provided with inwardly extending lugs, 6, provided with recesses, 7, which receive tenons, 8, on the ends of the handle-bars. The plates are firmly secured to the handle-bars by means of screws, 9, which pass through the plates and are embedded in the end portions of the handle-bars. Below the handle-bars is positioned the roller, 10, rotatably secured to the lower corner portion of the plates. For this purpose I prefer to provide in the ends of the roller, mortises, 11, in which are embedded bearing thimbles, 12, which receive studs, 13, on the lower corner portions of the plates, 5. Between the studs and thimbles are interposed ball bearings, 14. In operation, the operator grasps both handle-bars with one hand, and thus it is clear, has perfect control of the device.

Having thus described my invention, what I claim as new and desire to secure by Letters Patent of the United States is,—

1. A rolling-pin comprising two substantially parallel handle-bars, bearing plates at the ends of and interconnecting the handle-bars and extended therebelow, and a roller positioned below the handle-bars and between the axial planes thereof and rotatably connected with the bearing plates.

2. A rolling-pin comprising two substantially parallel handle-bars, triangular bearing plates at the ends of the handle-bars, the handle-bars being secured, respectively, to two corner portions of the plates, and a roller positioned below the handle-bars, and rotatably secured to the other corner of the plates.

In testimony whereof I have hereunto set my hand this 5th day of March, 1920.

OTTO ALEXANDER PRIBORSKY.